(12) United States Patent  
Best

(10) Patent No.: US 8,332,680 B2  
(45) Date of Patent: Dec. 11, 2012

(54) METHODS AND SYSTEMS FOR OPERATING MEMORY IN TWO MODES

(75) Inventor: Scott C. Best, Palo Alto, CA (US)

(73) Assignee: Rambus Inc., Sunnyvale, CA (US)

(*) Notice: Subject to any disclaimer, the term of this patent is extended or adjusted under 35 U.S.C. 154(b) by 819 days.

(21) Appl. No.: 12/220,453

(22) Filed: Jul. 24, 2008

(65) Prior Publication Data

US 2009/0049324 A1 Feb. 19, 2009

Related U.S. Application Data

(60) Provisional application No. 60/964,666, filed on Aug. 13, 2007.

(51) Int. Cl.
G06F 1/12 (2006.01)
G06F 13/42 (2006.01)
G06F 1/00 (2006.01)
G06F 13/00 (2006.01)
G06F 13/28 (2006.01)
H04L 5/00 (2006.01)

(52) U.S. Cl. .......................... 713/400; 713/500; 711/167

(58) Field of Classification Search .................. 713/400, 713/500; 711/167; 714/4.5, 4.11, 6.3, 43
See application file for complete search history.

(56) References Cited

U.S. PATENT DOCUMENTS

| | | | | |
|---|---|---|---|---|
| 4,393,501 A * | 7/1983 | Kellogg et al. | | 714/749 |
| 5,212,724 A * | 5/1993 | Nazarenko et al. | | 455/560 |
| 6,516,422 B1 * | 2/2003 | Doblar et al. | | 713/503 |
| 6,532,500 B1 * | 3/2003 | Li et al. | | 710/15 |
| 6,754,171 B1 * | 6/2004 | Bernier et al. | | 370/216 |
| 6,832,325 B2 * | 12/2004 | Liu | | 713/400 |
| 7,068,727 B1 * | 6/2006 | Lo et al. | | 375/295 |
| 7,558,326 B1 * | 7/2009 | Lyle et al. | | 375/244 |
| 7,562,247 B2 * | 7/2009 | Baker et al. | | 714/2 |
| 7,952,992 B1 * | 5/2011 | Ghorishi et al. | | 370/220 |
| 8,099,537 B2 * | 1/2012 | Suenaga et al. | | 710/106 |

(Continued)

FOREIGN PATENT DOCUMENTS

JP 01013611 A * 1/1989

(Continued)

OTHER PUBLICATIONS

Definition of "in lieu of", thefreedictionary.com (citing The American Heritage Dictionary of the English Language, Fourth Edition, 2000, Houghton Mifflin Company), retrieved from the Internet on Nov. 7, 2011 at <http://www.thefreedictionary.com/in+lieu+of>, p. 1.*

(Continued)

*Primary Examiner* — Faisal M Zaman

(74) *Attorney, Agent, or Firm* — Mahamedi Paradice Kreisman LLP; Lance M. Kreisman

(57) ABSTRACT

A memory system permits synchronized transmission of data with multiple memory modules in a dynamically expandable bus system such as with a point-to-point memory bus using strobed data transmission. Memory modules of the system are selectively configured to switch transmission modes to either transmit data to a memory controller or a timing reference signal to another memory module from a common terminal coupled to a common path of the bus which may depend on the number of memory modules configured in the system. The system permits all memory modules to operate with a strobed based memory controller even when some memory modules of the system do not share a strobe signal path with the memory controller of the system.

14 Claims, 6 Drawing Sheets

U.S. PATENT DOCUMENTS

| | | | |
|---|---|---|---|
| 2002/0095617 A1* | 7/2002 | Norman | 714/10 |
| 2002/0129215 A1* | 9/2002 | Yoo et al. | 711/167 |
| 2002/0181608 A1* | 12/2002 | Kim et al. | 375/295 |
| 2003/0033551 A1* | 2/2003 | Kuhn et al. | 713/401 |
| 2004/0168099 A1* | 8/2004 | Vorbach et al. | 713/600 |
| 2004/0186956 A1 | 9/2004 | Perego et al. | |
| 2004/0221106 A1* | 11/2004 | Perego et al. | 711/115 |
| 2004/0256638 A1 | 12/2004 | Perego et al. | |
| 2005/0007805 A1 | 1/2005 | Ware et al. | |
| 2005/0010737 A1 | 1/2005 | Ware et al. | |
| 2005/0166026 A1 | 7/2005 | Ware et al. | |
| 2005/0188232 A1* | 8/2005 | Weng et al. | 713/320 |
| 2005/0216677 A1* | 9/2005 | Jeddeloh et al. | 711/150 |
| 2005/0281203 A1* | 12/2005 | Cherukuri et al. | 370/242 |
| 2006/0020733 A1* | 1/2006 | Sarda | 710/305 |
| 2007/0033466 A1* | 2/2007 | Buchmann et al. | 714/731 |
| 2007/0073965 A1* | 3/2007 | Rajakarunanayake | 711/112 |
| 2007/0088995 A1 | 4/2007 | Tsern et al. | |
| 2007/0146011 A1* | 6/2007 | O'Mahony et al. | 326/93 |
| 2007/0195030 A1* | 8/2007 | Huang et al. | 345/87 |
| 2007/0234115 A1* | 10/2007 | Saika | 714/13 |
| 2008/0205453 A1* | 8/2008 | Travis | 370/503 |

FOREIGN PATENT DOCUMENTS

JP     02067016 A   *   3/1990

OTHER PUBLICATIONS

Beukema, T.; , "Design considerations for high-data-rate chip interconnect systems," Communications Magazine, IEEE , vol. 48, No. 10, pp. 174-183, Oct. 2010.*

Loschmidt, P.; Gaderer, G.; Sauter, T.; , "Synchronized Access to Sensor Networks," Sensors, 2006. 5th IEEE Conference on , pp. 785-788, Oct. 22-25, 2006.*

Yu Hongqi; Zhou Zhou; Yin Qinghong; Li Nan; Sun Zhaolin; Xu Xin; , "PXIe Based High-Speed Transmission System Design and Implementation," Intelligent System Design and Engineering Application (ISDEA), 2010 International Conference on , vol. 2, pp. 95-98, Oct. 13-14, 2010.*

Melnyk, A.; Salo, A.; , "Integrated services digital network controller architecture based on parallel reconfigurable processor," Modern Problems of Radio Engineering, Telecommunications and Computer Science, 2004. Proceedings of the International Conference , pp. 426-427, Feb. 28-28, 2004.*

* cited by examiner

METHODS AND SYSTEMS FOR OPERATING MEMORY IN TWO MODES

CROSS REFERENCE TO RELATED APPLICATIONS

This application claims the benefit of the filing date of U.S. Provisional Patent Application No. 60/964,666 filed Aug. 13, 2007, the disclosure of which is hereby incorporated herein by reference.

BACKGROUND

Computing, communications, consumer electronics and other processor-based systems are driven to host a larger number of applications, each with increasing complexity. The transfer of information and signals required among the components of these processor-based systems leads to increasing demands on the devices involved in transfer of data.

For example, as memory system speeds and capacity increase to satisfy the demand for more applications, maintaining good signal integrity becomes increasingly difficult. In memory systems that support multi-drop data topologies, which allow more than one device per data signal and support upgradeability by allowing multiple modules to be plugged into the bus, increases in capacity can degrade signal integrity, and as a result, decrease the maximum speed of operation of the memory system. In general, point-to-point signaling topologies (one device at each end of the signal line) have good signal integrity properties and even higher bus speeds but implementing upgradeability so as to support the addition of different of memory module can be complex depending on the types of memory involved.

One exemplary memory type that can be used with these systems is a double-data rate synchronous dynamic random access memory (e.g., the DDR-SDRAM family of products, which includes products of all DDR generations, including DDR1, DDR2, DDR3, DDR4, etc.). The DRAM is considered synchronous as it coordinates its operations to a provided clock signal, and it is considered double-data rate as it transfers data on both the rising and falling edge of the clock. DDR DRAM devices transmit and receive data using a strobe-based method. In this method, a strobe signal (referred to as the DQS signal in DDR-SDRAM parlance) is edge-aligned to and accompanies a group of data signals (referred to as the DQ signals in DDR-SDRAM parlance) sent by the DRAM in a "read" operation, and is center-aligned (also referred to as "quadrature aligned", as DQS is offset from the data edge by a quarter of the clock cycle time) to and accompanies the DQ signals in a "write" operation. This DQS signal is used by the receiving device to time the sampling of the data signal. In the memory controller (which is the receiving device during memory read operations), the DQS signal and the data are received and the DQS signal is then delayed by some fixed amount, nominally one-fourth of the memory system clock period. This delayed DQS signal, which is now approximately in quadrature with the received data, is then used as a common sample clock for each of the DQ input receivers for a particular number of bits of data associated with the strobe signal.

It may be desirable to implement such devices with different types of memory buses while maintaining general principles of operation for the system.

BRIEF DESCRIPTION OF DRAWINGS

The present technology is illustrated by way of example, and not by way of limitation, in the figures of the accompanying drawings, in which like reference numerals refer to similar elements including.

DETAILED DESCRIPTION

Figure 1:
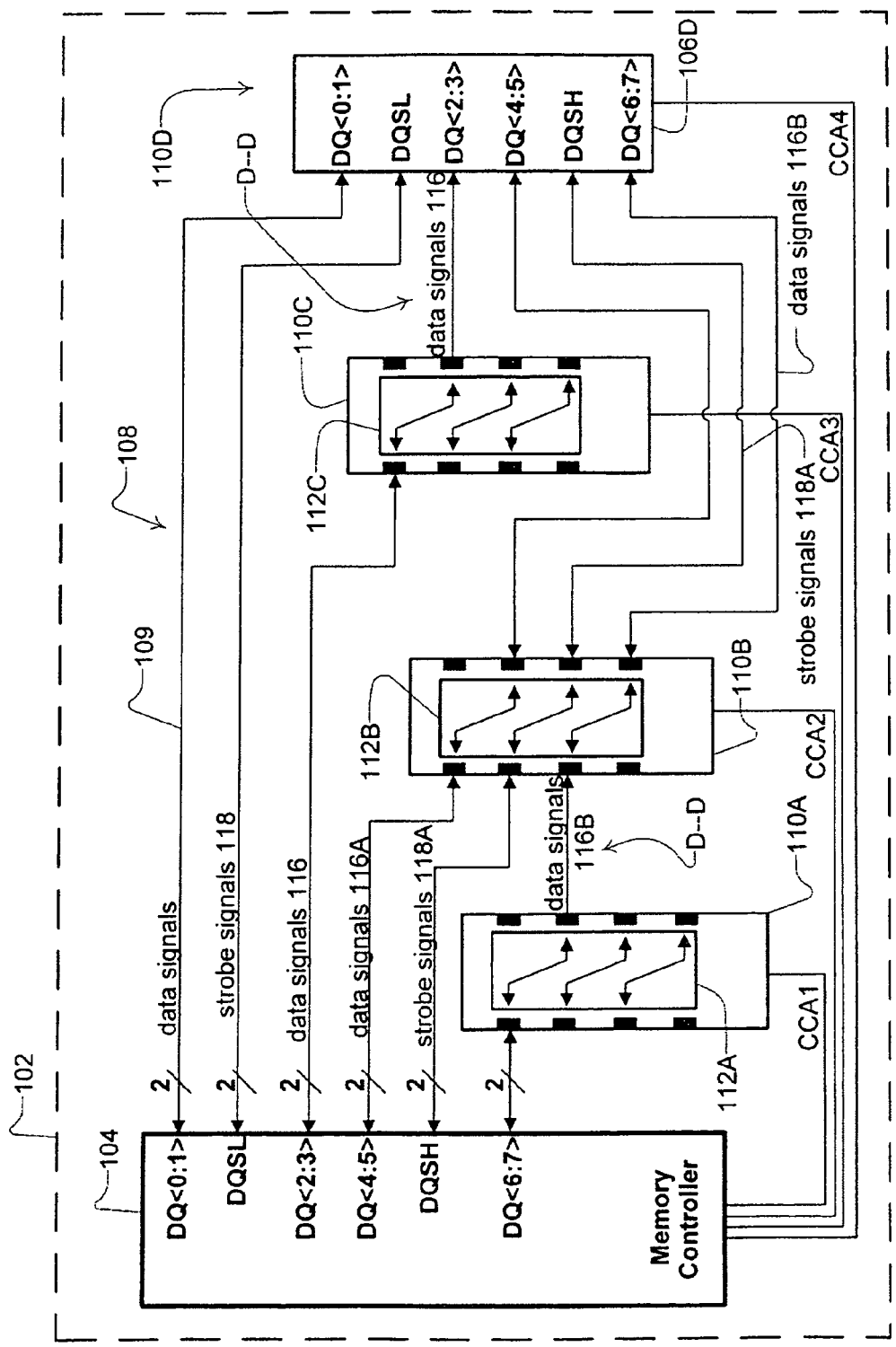
FIG. 1 shows example components in a memory system embodiment implementing module to module synchronization timing in a dynamic point-to-point architecture employing a single strobe-based memory module.
Figure 2:
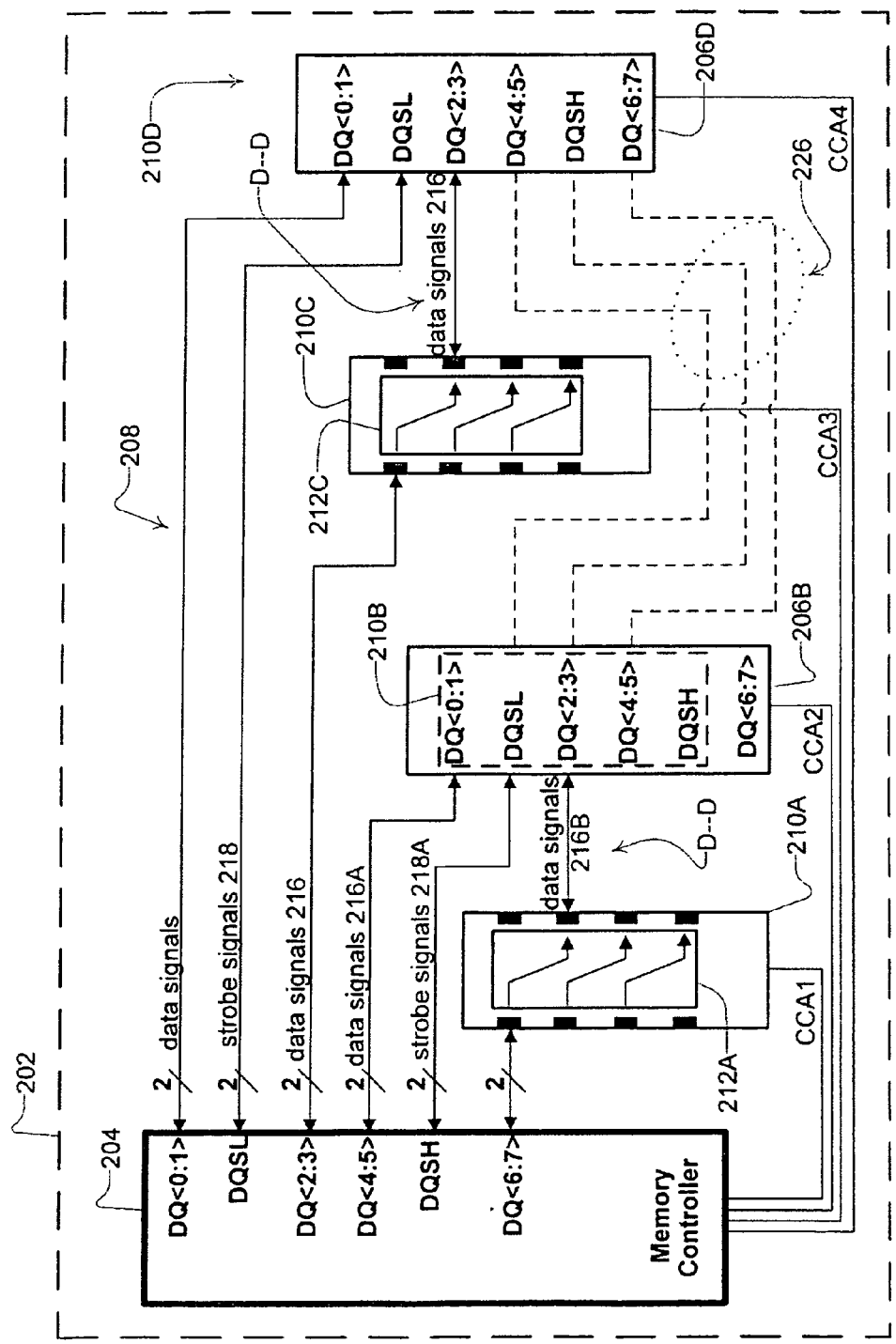
FIG. 2 shows example components in a memory system embodiment implementing module to module synchronization timing in a dynamic point-to-point architecture employing two strobe-based memory modules.
Figure 3:
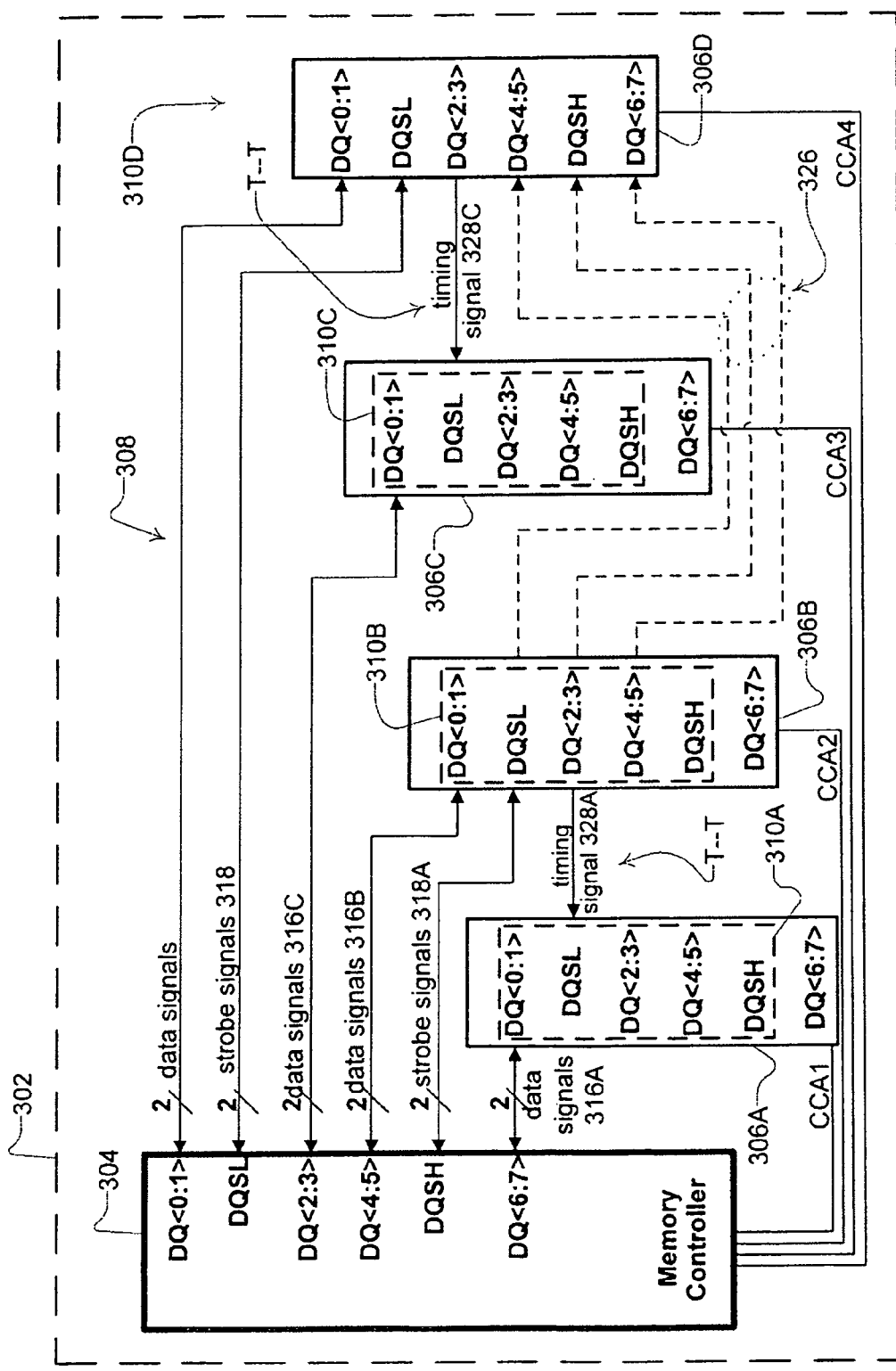
FIG. 3 shows example components in a memory system embodiment implementing module to module synchronization timing in a dynamic point-to-point architecture employing four strobe-based memory modules.

DDR-SDRAM devices are often utilized in a traditional "stub bus topology". In such a topology, the DQ and DQS signals from the memory controller are "point to multi-point." That is, when a DDR DRAM module is attached to the memory system, it's DQ and DQS signals share electrical contact with all of the other attached modules. As described earlier, due to signal integrity reasons, the maximum speed of operation of such a system is reduced each time a new module is added. In common practice, therefore, the speed of operation of a stub-bus memory system is determined using "worst case" capacity requirements. An alternative memory topology is known as "Dynamic Point-to-Point", which is fully-described in United States Patent Application Publication No. 2004/0221106. FIGS. 1, 2 and 3 illustrate how a DDR-SDRAM memory system can be realized with a dynamic point-to-point bus architecture. As shown in FIG. 1, the data system 102 typically includes a first circuit such as memory controller 104. The data system 102 further includes a second circuit (e.g., a DRAM device) which in this embodiment is disposed on a memory module 106D such as a DDR-SDRAM module. A signal bus 108 or set of one or more channels or signal paths extend between memory controller 104 and memory module 106D. It will be understood that there may optionally be additional signal lines between the memory controller 104 and memory module 106D. For example, the system may have a signal control line for each memory module as illustrated by lines CCA1, CCA2, CCA3 and CCA4 of FIG. 1. There may also be other signal lines or terminals for the memory controller 104 for communication with other components, such as a CPU of a computer. However, these have not been shown for purposes of simplifying the description of the technology. Moreover, although the embodiment shown uses one CCA bus per module, other embodiments could use fewer or more.

In the particular embodiment depicted, the first circuit block or memory controller 104 is formed as one integrated circuit chip and the second circuit block disposed on memory module 106D includes one or more integrated circuit chips (e.g., DRAM chips) separate from chip 104. The signal bus 108 may include elements commonly used for transmission of signals between chips as, for example, wires or conductors on a circuit panel. Merely by way of example, the memory controller 104 and memory module 106D may be parts of a single computer system or other electronic device, and may be disposed in proximity to one another as, for example, within about 10 meters of one another, and the signal bus may be less than about 10 meters long.

Memory controller 104 will typically include one or more transmitters and receivers (not shown) arranged to receive or transmit signals at terminals of the device such as data signals DQ, timing signals or strobe signals such as DQS. In FIG. 1, two data-strobe signal DQS are shown: one for the lower half of a ×8 byte (i.e., the low strobe signal DQSL), and one for the upper half of a ×8 byte (i.e., the high strobe signal DQSH). Merely by way of example, each such signal may be a single-ended voltage or current signal sent along an individual conductor of a channel, or may be a differential voltage or current signal sent along a pair of conductors. The transmitters may incorporate appropriate voltage or current drivers (not shown) for generating these signals and may optionally be implemented with signal transmit equalization circuitry. Similarly, receivers may be implemented with samplers or comparators and may optionally be implemented with receive equalization circuitry. These circuits will also typically be implemented in conjunction with timing circuits, such as DLL or PLL circuits for controlling timing of operations of the circuit components.

The memory controller 104 will also typically include a control circuit (not shown) for generating control signals which control the operating modes of the components of the memory controller 104 and one or more memory modules via one or more control channels (such as control lines CCA1, CCA2, CCA3, CCA5) to the memory modules. The control circuit actuates the operations required for writing data into one or more of the memory modules and for reading data out of the one or more memory modules. The control signals may also include addressing information that may be necessary for accessing certain cells of each particular memory module to be written or read.

It will be understood that when the second integrated circuit on memory module 106D is a memory device, it will include a memory core (not shown) with cells for storing data as well as addressing circuits for accessing various data cells of the memory. The memory core may be formed by one or more memory circuits such as one or more dynamic random access memories, static random access memory, flash memory circuits, or any other type of memory device. The integrated circuits disposed on the memory module 106D will further include receivers and transmitters (not shown) at the terminals of the device that may be used to receive and transmit data stored or to be stored in the memory core. The receivers and transmitters will typically complement the receiver and transmitters of the memory controller 104 for sending and receiving signals with the memory controller 104 and other memory modules on the signal bus 108 as discussed in more detail herein.

In one exemplary embodiment, the data system 102 is a DDR-SDRAM memory system, and signal bus is a point-to-point signal bus. That is, each signal path or signal line of the signal bus 108 will have one device at each end, e.g., communication components of a DRAM memory device disposed on module 106D and communication components of a memory controller 104. In such an exemplary embodiment of FIGS. 1 to 3, twelve signal lines are shown, eight of which are DDR-SDRAM data signal lines from the DQ<0:1>, DQ<2:3>, DQ<4:5> and DQ<6:7> data terminals and four of which are strobe lines from the DQSL/DQSL# (where "#" indicates electrical complement) and DQSH/DQSH# strobe terminals. However, additional or fewer such terminals and lines may be added as desired depending on the desired data width of the bus and the desired number of strobe lines. For example, a typical DDR-SDRAM system has data bus-widths of 64 or 72 bits, with one strobe and one strobe-complement signal for every 4 or 8 data bits. In the example of the figures, there are only two strobe pairs and eight data bits shown, but it should be understood that this extremely simple system is intended merely to teach the technique, and not to restrict its applicability to a useful memory system.

The exemplary memory system of FIGS. 1, 2 and 3 utilizes a plurality of module sockets (110A, 110B, 110C, and 110D) having connectors, pins or pads (not shown) for electrical connection of modules with the signal paths of the signal bus 108. As illustrated in the embodiment of FIG. 1, three empty module sockets 110A, 110B, 110C divide the signal paths between the memory controller 4 and the last socket 110D (which is populated with memory module 106D). Further sockets may be included as desired and may be a function of the desired maximum memory capacity of the data system 102.

As illustrated in the exemplary memory system of FIG. 1, module sockets 110A, 110B and 110C are populated with continuity modules 112A, 112B, 112C respectively. As described in United States Patent Application Publication No. 2004/0221106, a continuity module 112A, 112B, 112C may be seated within a socket 110A, 110B, 110C so as to pass the signal from one electrical trace on one side of the module socket to the another electrical trace on the other side of the module socket. By populating module sockets 110A, 110B and 110C each with a continuity module, there exists a continuous, point-to-point electrical connection from the memory controller 104 to a memory module 106D. Such continuity modules may be simply formed with very low-cost circuit boards with passive conductive traces and connectors, pins or pads adapted for the sockets 110A, 110B, 110C. Typically, such continuity modules 112A, 112B, 112C will not include any active circuit elements, but merely (as the name suggests) provide electrical continuity.

The system as illustrated in the configuration of FIG. 1, using three continuity modules 112A, 112B and 112C and one memory module 106D, can be operated in the normally understood read and write modes of operation for a memory system. That is, via the command, control and address bus represented as CCA4, the memory controller can signal memory module 106D which populates the last module socket 110D. Normal data transactions take place utilizing the point-to-point electrical pathways enabled by the continuity modules 112A, 112B and 112C.

For example, in a read operation, the data terminals of the memory controller 104 (e.g., DQ<0:1>, DQ<2:3>, DQ<4:5> and DQ<6:7>) connect with the respective data terminals of the memory module 106 (e.g., DQ<0:1>, DQ<2:3>, DQ<4:5> and DQ<6:7>) across the signal bus 108. Specifically, data signals from terminals DQ<0:1> and DQSL of memory module 106D connect directly to DQ<0:1> and DQSL of controller 104 via signal trace 109; data signals from terminals DQ<2:3> of memory module 106D connect to terminals DQ<2:3> of the memory controller 104 via continuity module 112C which populates module socket 110C; data signals from terminals DQ<4:5> of memory module 106D connect to terminals DQ<4:5> of the memory controller 104 via continuity module 112B which populates module socket 110B; data signals from terminals DQ<6:7> and DQSH of memory module 106D connect to terminals DQ<6:7> and DQSH of the memory controller 104 via continuity module 112A which populates module socket 110A. In this read operation, memory module 106D transmits 8-bits of data, where the lower 4 bits (DQ<0:3>) are edge aligned to the DQSL complementary signal pair, and the higher 4 bits (DQ<4:7>) are edge-aligned to the DQSH complementary signal pair. In adherence to normal DDR-SDRAM signaling conventions, the memory controller 104 is able to utilize the provided strobe signals to capture the data transmitted during the read operation. In this exemplary read operation, all 8-data bits as well as the strobe signals which provide the read-timing reference for those signals are provided via memory module 106D (more specifically, from the memory devices situated on that memory-module).

The system of FIG. 2 operates in a similar manner to the system of FIG. 1. However, in this configuration an additional memory module 206B is added to a socket 210B and continuity module 212B removed such that two memory modules 206B, 206D are utilized. Now, only two continuity modules 212A, 212C are utilized. Due to the configuration of the signal bus 208 and the removal of continuity module 212B, several of the signal paths of the signal bus 208 no longer terminate at the memory module 206D but rather terminate at the additional memory module 206B. Specifically, data signals from terminals DQ<0:1> and DQSL of memory module 206D connect directly to DQ<0:1> and DQSL of controller 204 via signal trace of signal bus 208; data signals from terminals DQ<2:3> of memory module 206D connect to terminals DQ<2:3> of the memory controller 204 via continuity module 212C which populates module socket 210C; data signals from terminals DQ<0:1> and DQSL of memory module 206B connect directly to terminals DQ<4:5> and DQSH of the memory controller 204; data signals from terminals DQ<2:3> of memory module 206B connect to terminals DQ<6:7> of the memory controller 204 via continuity module 212A which populates module socket 210A. As a consequence, several paths of the signal bus 208 are no longer used for the signals (data or strobe) transfer in this configuration. These lines are shown as dashed signal-less paths 226 of the signal bus 208.

Thus, in the illustrated configuration of FIG. 2, in an exemplary read operation, memory module 206D now transmits only 4-bits of data to the controller (DQ<0:3>), edge aligned to the DQSL complementary signal pair. The higher 4 bits (DQ<4:7>) are transmitted by memory module 206B, edge-aligned to the DQSH complementary signal pair. In adherence to normal DDR-SDRAM signaling conventions, the memory controller 204 is still able to utilize the provided strobe signals to capture the data transmitted during the read operation. In this exemplary read operation, two modules (206B and 206D) each transmit 4-data bits as well as the strobe signals which provide the read-timing reference for those signals. In contrast to FIG. 1, however, the memory system capacity has now increased (e.g., if memory module 206D and memory module 206B are both 2 GB modules, the total memory system capacity has increased from 2 GB to 4 GB). And although the capacity has increased, point-to-point connections for all data signals have been maintained.

As is explained in the aforementioned United States Patent Application Publication No. 2004/0221106, to accommodate such a reduction in use of available terminals of the memory modules 206D and 206B, each of the devices disposed on memory modules 206D, 206B of the system can be configured to operate in different modes to route received data or data to be transmitted to and from its memory core depending on which terminals will be operated in the memory modules as illustrated in the example configurations of the figures. Thus, the data width of the memory module 206D will be reduced in conjunction with a reduction of active terminals of the module upon addition of further memory modules 206D to the system. On the other hand, the memory controller 204 may operate in the same fashion as it did in the configuration of FIG. 1 without changing its operation. Thus, the data width of the memory controller 204 and signal bus 208 may remain constant notwithstanding changes to the number of memory modules introduced to the system 202.

The system 302 of FIG. 3 operates in a similar manner to the system of FIG. 2. However, in this configuration continuity modules 212A and 212C have been replaced by further memory modules 306A and 306C. Consequently, signals previously propagated by the continuity modules 212A and 212C in the configuration of FIG. 2, now terminate with the memory modules 306A and 306C respectively. For example, in the configuration of FIG. 3, the data signals 316A connect the DQ<6:7> terminals of the memory controller 304 directly to the DQ<0:1> terminals of the memory module 306A. Moreover, data signals 316B connect directly between the DQ<4:5> terminals of the memory controller 304 and the DQ<0:1> terminals of the memory module 306B, while the data signals 316C connect directly between the DQ<2:3> terminals of the memory controller 304 and the DQ<0:1> terminals of the memory module 306C. Thus, the data width per memory module is further reduced when compared to the system configurations of FIGS. 1 and 2. As described above, the memory system capacity has again increased (e.g., if all modules 306A thru 306D are 2 GB in capacity, the total memory system capacity has increased from 2 GB in FIG. 1 to 8 GB in FIG. 3), while point-to-point connections for all data signals has been maintained.

Figure 6:
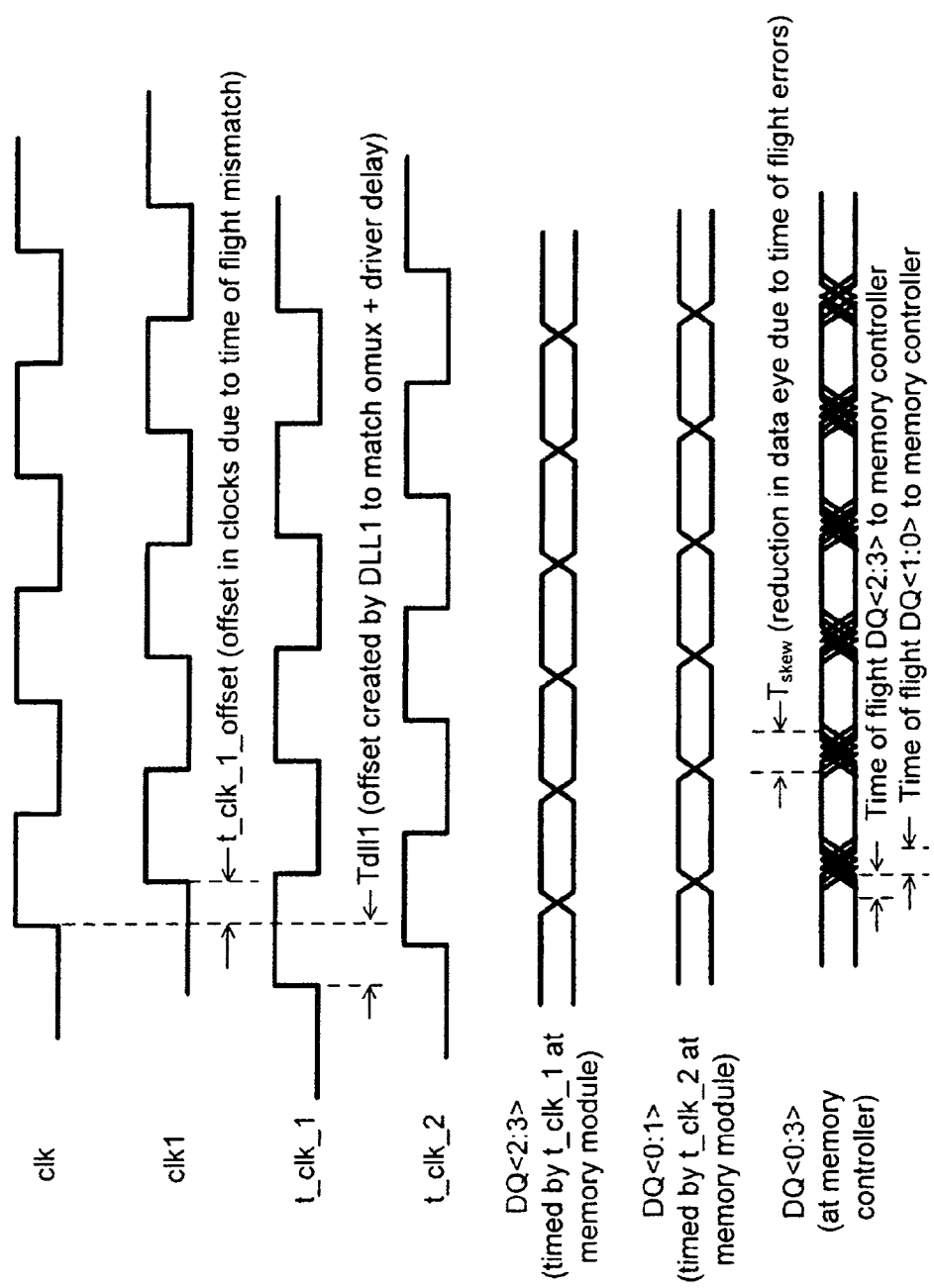
FIG. 6 illustrates signal timing relationships of components of a system not employing module to module synchronization timing.

However, in this configuration memory modules 306A and 306C do not have signal paths for transmission of at least one strobe signal between the memory controller 304 and either of the memory modules 306A and 306C. That is, while DQSL of module 306B (for example) is still a valid timing reference for DQ<0:1> of module 306B (which interfaces with DQ<4:5> of controller 304), it is not a valid timing reference for DQ<0:1> of module 306C (which interfaces with DQ<2:3> of controller 304). The primary reason it is not a valid timing reference is discussed below, and is illustrated in FIG. 6. Put simply, the "time of flight" difference between signals originating on module 306B and signals originating on 306C (created due to the modules' different physical distance to the controller) will create a data-eye skew that is a substantial portion of the available timing budget at high data rates. As it is desired to operate the dynamic point-to-point system as a strobed memory system without requiring circuit modification to memory-controller 304, the memory modules 306A and 306C may be set in an operating mode that utilizes an additional timing reference signal generated and transmitted to the memory modules 306A and 306C by another circuit such as a circuit of one of the memory modules 306B or 306D. Thus, data transmission during a memory read operation with the memory modules 306A and 306C can be synchronized to timing reference signals 328A and 328C received from memory modules 306B and 306D respectively. Consequently, memory modules 306B and 306D may be set to an operating mode for generation and transmission of the timing reference signals 328A and 328C.

For example, as illustrated in FIG. 3, memory module 306A receives a timing reference signal 328A generated and transmitted by memory module 306B. In this timing signal generation mode set in memory module 306B, the memory module 306B utilizes at least one of the DQ<2:3> terminals and its connected signal paths of the signal bus 308 to send a timing signal rather than sending a data signal. That is, with module socket 310A populated with memory module 306A, bits DQ<2:3> from memory module 306B, and their associated electrical traces (labeled as "T—T") in FIG. 3) between module 306B and 306A, were previously unused. Thus, the memory module may be set to multiple modes to either transmit a timing signal or data signal from a terminal of the memory module. Moreover, this implementation of multiple transmission modes can optimize the use of one or more paths of the signal bus 8 such that the paths can be used for data transmission in some operating configurations of the system as illustrated by lines D—D in FIGS. 1 and 2 while the same paths can be used for timing signal transmission in other operating configurations of the system as illustrated by reference lines T—T in FIG. 3. Moreover, by utilizing a memory module 306D and 306B for generation of the additional timing reference signals, and by memory modules 306C and 306A using the provided timing reference signals to synchronize their transmissions during read operations, the memory controller 304 may operate in the same fashion as it did in the configuration of FIGS. 2 and 1 without changing its operation or construction.

Figure 4:
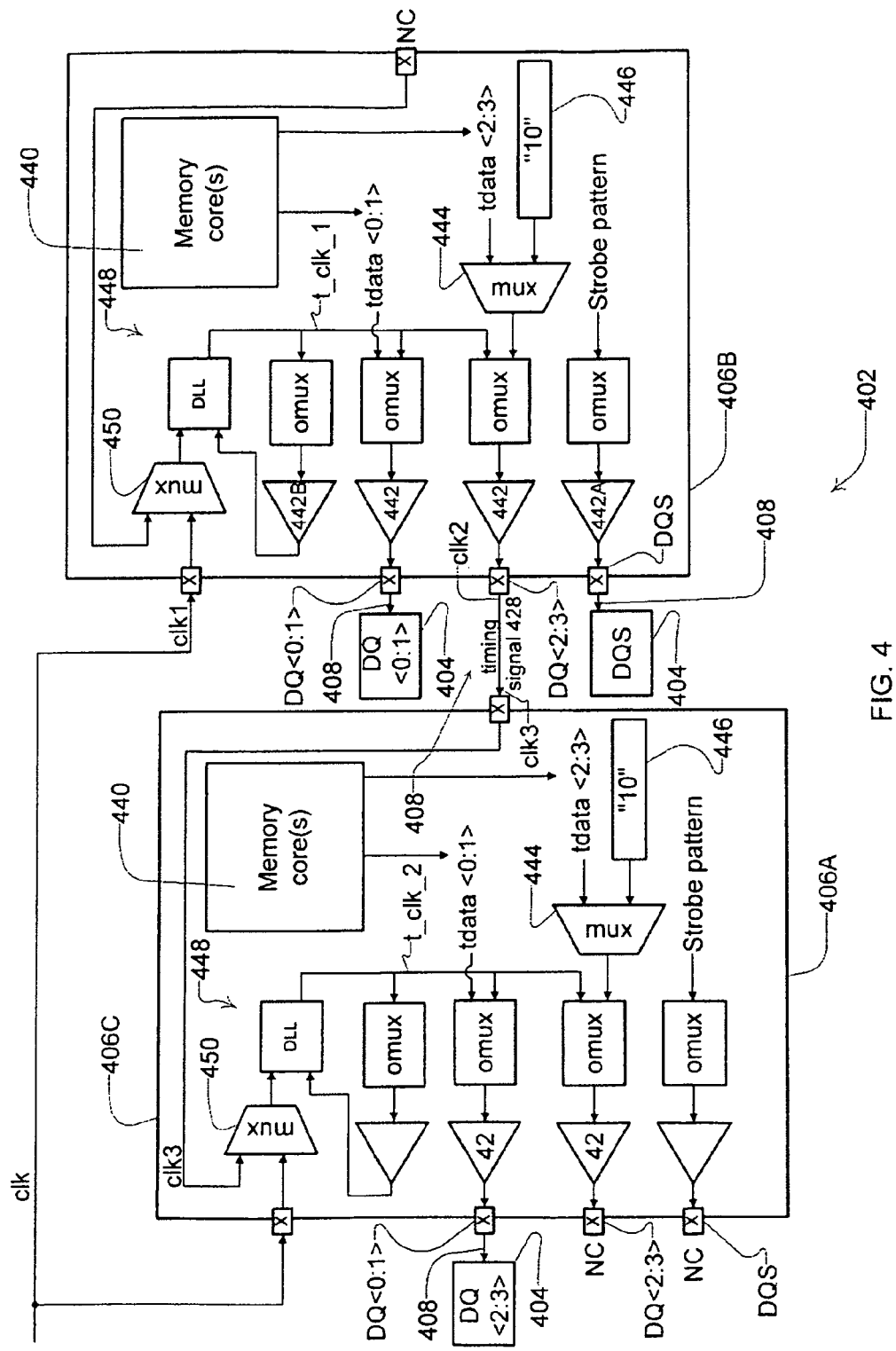
FIG. 4 illustrates an exemplary components that may be implemented in a memory modules for a system employing module to module synchronization timing in a dynamic point-to-point bus architecture.

Example transmission components of a circuit realized on a memory module suitable for implementing the various modes of the system described herein are shown in the block diagram of FIG. 4. In common practice, these circuits will be realized either in the DRAM components themselves, or in DRAM buffer circuits which accompany DRAM components on the memory module. For purposes of illustration, this description will refer to 406A and 406B simply as "memory devices." In FIG. 4, which shows two such circuits (e.g., circuits realized on memory devices 406A and 406B), memory core 440 stores the data (which is transmitted during a read operation) on a path of the signal bus 408, which has a data path width of four bits in the illustrated example and an associated complementary strobe pair. In this example, only transmit circuitry is shown, which would be utilized in memory read modes of operation. Any receive circuitry associated with write-modes of operation is presumed to be in place, but is omitted in the figure for clarity. Data to be transmitted (e.g., tdata<0:1> or tdata<2:3>) supplied by the memory core 440 is routed to the memory module's terminals (e.g., DQ<0:1> and DQ<2:3>) via drivers 442. Data that will be supplied to the drivers 442 may pass through an optional output multiplexer circuit (omux). The output multiplexer circuit is configured to control the drivers 442 of the different data terminals of the memory module for data transmission at a double data rate (DDR). Also shown in memory devices 406A and 406B is timing reference circuit 448 (discussed in more detail below), including a delay-locked loop circuit (DLL), which is used to generate transmit clock signals t_clk_2 and t_clk_1. With the DLL and omux circuit as shown, the drivers 442 transmit their data signal in response to the rising edge and the falling edge of the respective transmit clock signal.

The circuits realized on memory devices 406A and 406B similarly include drivers 442A for transmission of a strobe pattern signal via the DQS terminal of the memory modules when utilized with an available channel of the signal bus 408. The strobe pattern signal may be provided by a strobe signal generator (not shown). The strobe pattern may be a conventional signal for indicating the timing of data transfer from the memory devices 406B and 406A. Typically, in a DDR-SDRAM memory system, the strobe pattern signal may include a preamble pattern to indicate to the memory controller 404 that data transmission will commence. The strobe pattern following the preamble pattern is typically edge aligned with the data signal transmitted from the memory devices 406A and 406B during a read operation.

In order to support the transmission of a timing reference signal to another module, the exemplary transmission circuits shown in FIG. 4 include a switch or multiplexer circuit 444. The switch circuit 444 assists in implementing the modes of operation of the memory module to selectively transmit, during a read operation, either normal read data (e.g., tdata<2:3> in memory device 406B) or a timing reference signal used by a different memory module (e.g., memory device 406A). The switch circuit may be realized as a simple 2-to-1 multiplexer with a two-bit first input, a two-bit second input, a one-bit selection signal, and a two-bit output. In response to a first state of the selection signal, two bits of data from memory core 440 are driven to the multiplexer output (where, subsequently, the omux circuit serializes that two-bit signal into a one-bit double-data rate signal at the output). In response to the opposite state of the selection signal, a fixed "10" signal is driven to the output of the multiplexer. This fixed pattern, when serialized by the omux circuit, would create a signal that is high for half the cycle, and low for the other half (i.e., an oscillating signal such as a "1010101 . . . ") which can be used as a timing reference signal by subsequent memory modules.

The switch circuit or multiplexer 444 is selectively controlled by the memory module to output either the oscillating data signal or the data of the memory core. Selective control of the output of the switch circuit 444 may be implemented with hardware and/or software and may be manually or automatically set. For example, the memory controller 404 may automatically detect the memory module configurations as previously described by determining the number of present memory modules. The memory controller 404 may then selectively configure the memory modules such as by setting a latch circuit or control register (not shown) by control signals from the memory controller 404. The latch circuit or control register may then control the state of the selection signal of the switch circuit 444.

As described above, the two-bit output of the switch circuit or multiplexer 444 is coupled to the two-bit input of the output multiplexer circuit. The output multiplexer circuit ("omux") simply serializes the two-bit input signal in response to a clock signal: the first input bit is coupled to the output when the clock signal is high, the second input bit when the clock is low. The output multiplexer circuit's output is coupled with the driver 442 so as to provide a signal for transmission by the driver 442. Thus, the driver 442 that is coupled via the omux to the output of the switch circuit 444 can either transmit data to the memory controller 404 or a timing reference signal 428 to memory device 406A on the signal bus 408 depending on the set mode of the memory module.

As further illustrated in FIG. 4, the timing reference signal 428 when present may be selectively supplied to a timing circuit 448. The timing circuit 448 generates a transmit clock signal such as t_clk_1 or t_clk_2 used for synchronizing the memory module's transmissions via drivers 442, 442A. As is well known in the art, the timing circuit 448 may be implemented with circuit elements such as one or more DLL or PLL circuits and a replica feedback circuit including a driver 442B and output multiplexer OMUX. The replica feedback circuit provides delay matching in the feedback path to compensate for the signal delay associated with the driver 442 and output multiplexer OMUX used in data, strobe or timing signal transmission. Thus, the replica circuit assists in generating a transmit clock signal that compensates for delay introduced by the driver 442 and output multiplexer OMUX and helps to provide accurately synchronized transmission (discussed in more detail below).

In memory device 406A of FIG. 4, a timing signal multiplexer circuit 450 selectively outputs either a bus clock signal shown as "clk" or the signal "clk3" (derived from timing reference signal 428) to the reference timing input of circuit 448 of the memory device 406A. Thus, as previously discussed, the memory modules may selectively utilize signal 428 as the timing reference signal for transmissions during read operations, depending on the various system configurations previously discussed. Thus, the memory controller 404 may utilize the strobe signal transmitted from memory device 406B for timing data reception at the memory controller 404 of data transmitted from memory device 406A even though the memory device 406A does not itself generate a strobe signal to indicate timing for the memory controller 404 (or, in an alternative embodiment, the strobe signal generated by memory device 406A is simply left unconnected). In other words, the memory device 406A synchronizes its transmission of data with memory device 406B based on the timing reference signal 428 from memory device 406B so that a strobe signal of just one of the memory devices may be used for both. As a consequence, the data transmitted (during a read operation) by the modules on which the memory devices 406A and 406B are disposed will arrive in good edge alignment at the memory controller 404.

Figure 5:
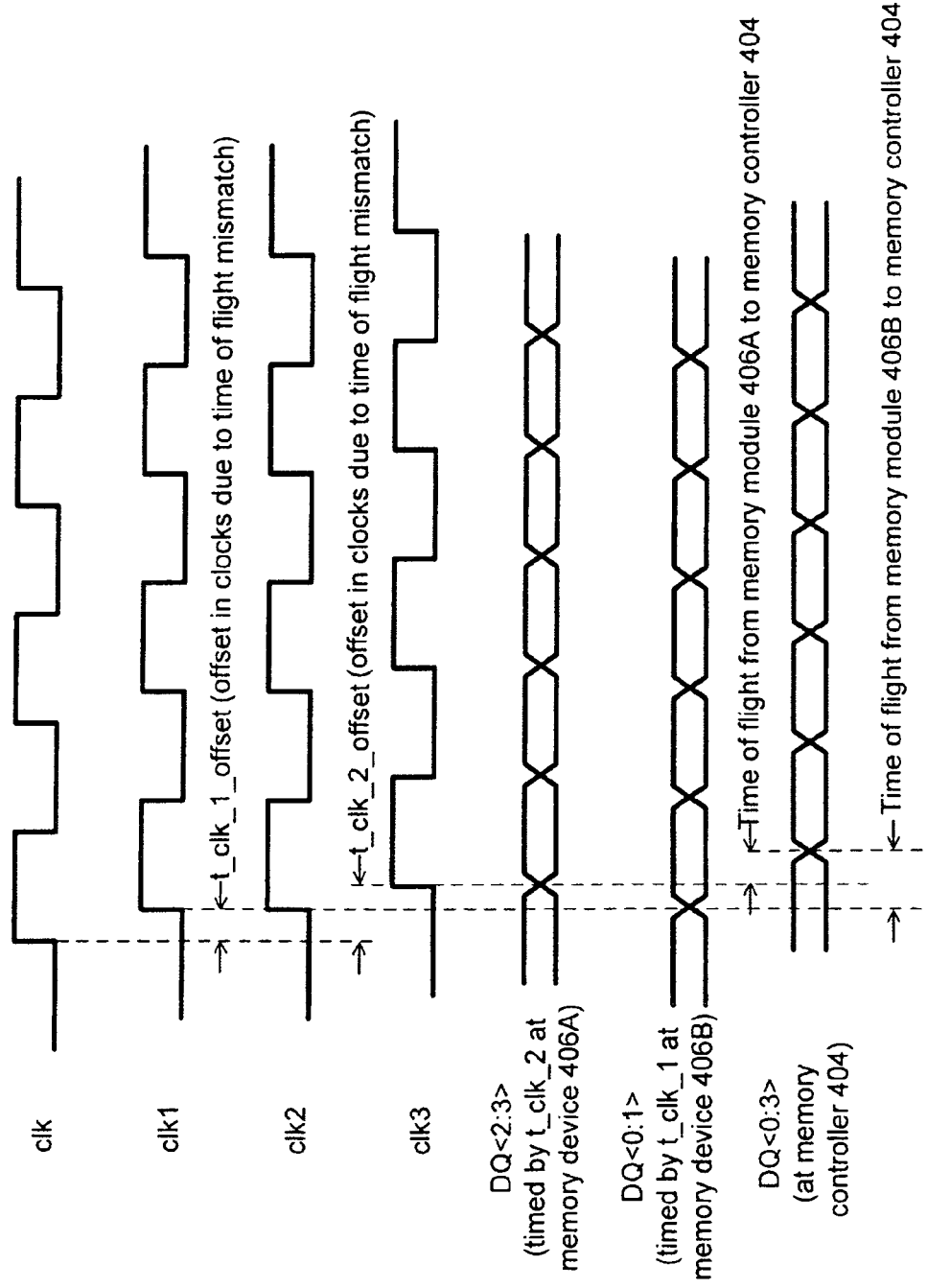
FIG. 5 illustrates signal timing relationships of components of a system employing module to module synchronization timing in a dynamic point-to-point bus architecture.

A waveform diagram that illustrates the timing relationships of the circuits is shown in FIG. 5 with respect to the exemplary system shown in FIG. 4. The bus clock signal at "clk" is connected to memory device 406A. The same signal propagates to memory device 406B but, due to the additional transfer time resulting from the additional signal path length between memory device 406A and 406B (also known as the "time of flight" between device 406A and 406B), the signal at "clk1" is delayed with respect to the signal at clk by an offset amount shown as t_clk_1_offset on FIG. 5. Due to the use of the timing circuit 448 with the replica circuit, the timing reference signal 428 at clk2 will be edge-aligned with the clock signal at clk1. However, the timing reference signal 428 shown at clk3 will be delayed by an additional offset amount shown as t_clk_2_offset on FIG. 5 as a result of the propagation delay of the signal between memory device 406B and memory device 406A. Thus, the t_clk_2 transmit clock signal for module 406A will have an offset with respect to the t_clk_1 transmit clock signal for module 406B approximately equal to the propagation delay of the bus clock signal from clk to clk1 plus the delay of the timing reference signal 428 from clk2 to clk3.

When data is transmitted from the memory device 406A at the DQ<2:3> terminal, it is transmitted using the t_clk_2 transmit clock signal. When data is transmitted from the memory device 406B at the DQ<0:1> terminal, it is transmitted using the t_clk_1 transmit clock signal. As a consequence of the transmit clocks relative offset, the data transmitted from memory module 406A (shown as the DQ<2:3> signal graph of FIG. 5) is delayed relative to the data that is transmitted from memory device 406B (shown as the DQ<1:0> signal graph of FIG. 5). This delay assists in compensating for the different propagation delays or different flight times that each will experience due to their different distances from the memory controller 404. As a result, each data signal may be received at the memory controller 404 approximately edge-aligned as shown in the DQ<0:3> graph signal of FIG. 5. Thus, if the memory controller 404 is a type that utilizes the timing from a strobe signal from one of the memory modules for data reception, a strobe signal from one memory module can be used to time the sampling of the transmitted data the memory module sending the strobe signal and from another memory module not sending the strobe signal.

A benefit of this application of the timing reference signal in data transmission of the system 402 may be more readily apparent when comparing timing graphs of a comparable system that does not employ such a timing reference signal in the transmission of data but simply employs the clock signals clk1 and clk for timing transmission from the two memory devices 406A and 406B. The timing of data transfer for such a system is illustrated by the signal graphs of FIG. 6. When the similar clock signal clk and clk1 each arrive at the respective memory devices 406A and 406B, they are out of alignment by a time difference "t_clk_1_offset" shown in FIG. 6 as a result of their different time of flights to the memory devices 406A and 406B from the memory controller. As a result, clk1 is delayed with respect to clk. As a consequence, the transmit clock signals t_clk_1 and t_clk_2 (of FIG. 4) based on these clocks (clk1 and clk respectively) would also be out of alignment by a comparable amount of time after the timing adjustment made by the timing circuits 448. Thus, t_clk_1 would be delayed with respect to t_clk_2 comparable to the delay between clk1 and clk. Consequently, if these transmit clocks were used at the drivers 442, the data transmitted based on the timing of t_clk_1 would be delayed with respect to the data transmitted based on the timing of t_clk_2. Additionally, due to the different time of flights for the data from the different memory modules to the memory controller, the data timed by t_clk_1 (which is already delayed with respect to t_clk_2) would arrive at the memory controller with even further delay. This accumulated synchronization delay would result in a significant skew ($T_{skew}$ shown in FIG. 6) that reduces the data eye at the memory controller. The configuration of the system of FIG. 4 utilizing the timing reference signal 428 may reduce such skew in data transmission so that the data signals from the different memory modules may arrive substantially edge-aligned at the memory controller 404 as previously described.

In general, each of the circuits implemented in the technology presented herein may be constructed with electrical elements such as traces, capacitors, resistors, transistors, etc. that are based on metal oxide semiconductor (MOS) technology, but may also be implemented using other technology such as bipolar technology or any other technology in which a signal-controlled current flow may be achieved.

Furthermore, these circuits may be constructed using automated systems that fabricate integrated circuits. For example, the components and systems described may be designed as one or more integrated circuits, or a portion(s) of an integrated circuit, based on design control instructions for doing so with circuit-forming apparatus that controls the fabrication of the blocks of the integrated circuits. The instructions may be in the form of data stored in, for example, a computer-readable medium such as a magnetic tape or an optical or magnetic disk. The design control instructions typically encode data structures or other information describing the circuitry that can be physically created as the blocks of the integrated circuits. Although any appropriate format may be used for such encoding, such data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer readable medium. Those of skill in the art of integrated circuit fabrication can then use such encoded data to fabricate integrated circuits comprising one or more of the circuits described herein.

In the foregoing description and in the accompanying drawings, specific terminology and drawing symbols are set forth to provide a thorough understanding of the present technology. In some instances, the terminology and symbols may imply specific details that are not required to practice the technology. For example, although the terms "first" and "second" have been used herein, unless otherwise specified, the language is not intended to provide any specified order but merely to assist in explaining elements of the technology.

Moreover, although the technology herein has been described with reference to particular embodiments, it is to be understood that these embodiments are merely illustrative of the principles and applications of the technology. It is therefore to be understood that numerous modifications may be made to the illustrative embodiments and that other arrangements may be devised without departing from the spirit and scope of the technology. For example, although wired channels are explicitly discussed, wireless channels may also be implemented with the technology such that transmissions may be made between chips using wireless transmitters and receivers that operate by, for example, infrared data signals or electromagnetic data signals sent between the circuit blocks of the technology. Similarly, the channels may be implemented with capacitive, inductive and/or optical principles and can use components for such channels, such as the transmitter and receiver technology capable of transmitting data by such channels. Moreover, although particular operating modes have been described for particular memory modules, it is understood that the memory modules may be constructed uniformly so that any particular module can operate as described in any of the sockets of the memory system.

The invention claimed is:

1. A method of operating a memory system in two modes comprising:
    transmitting, on any one of a plurality of signal lines, a data signal representing read or write data in accordance with a first signaling protocol between a memory controller and a memory in a first mode, the memory controller operating at a first data rate in the first mode; and
    transmitting, on the signal line and in lieu of the data signal, a timing signal representing a timing reference in a second mode, the memory controller operating at the first data rate in the second mode and wherein the timing signal is transmitted in accordance with the first signaling protocol.

2. The method of claim 1, wherein the memory comprises a first memory module and the signal line links the first memory module with a second memory module and wherein the transmitting each of the data signal and the timing signal each includes transmitting between the first memory module and the second memory module.

3. The method of claim 1, wherein the any one of a plurality of signal lines is an intermodule path in a point to point memory system.

4. The method claim 1, wherein the memory comprises a dynamic random access memory.

5. The method of claim 1 wherein the memory operates with a first data width in the first mode, and a second data width less than the first data width in the second mode.

6. An apparatus comprising:
    a memory; and
    a transmitter coupled with the memory to transmit a data signal from the memory;
    wherein the transmitter has a first mode to transmit data in accordance with a first signaling protocol over at least one path of a plurality of data paths, the plurality of data paths transferring aggregate data at a first data rate in the first mode, and
    wherein the transmitter has a second mode to transmit a timing signal in lieu of the data signal over the at least one path of the plurality of data paths, the timing signal transmitted in accordance with the first signaling protocol, and wherein the plurality of data paths transfer aggregate data at the first data rate in the second mode.

7. The apparatus of claim 6, wherein the plurality of data paths comprises a point-to-point bus.

8. The apparatus of claim 6, wherein the memory comprises a dynamic random access memory.

9. The apparatus of claim 6 wherein the memory operates with a first data width in the first mode, and a second data width less than the first data width in the second mode.

10. A memory system comprising:
    a memory controller;
    a bus coupled to the memory controller;
    a plurality of memory module sockets coupled to the bus;
    a memory module coupled to one of the memory module sockets, the memory module including at least one pin adapted to selectively provide either a data signal or a timing signal in lieu of the data signal, the data signal and the timing signal provided in accordance with a common signaling protocol, and wherein the memory controller maintains an aggregate data rate irregardless of whether the at least one pin provides the data signal or the timing signal.

11. The memory system of claim 10, wherein the memory module is a strobed memory.

12. The memory system of claim 10, embodied as a dynamic point-to-point memory system.

13. The memory system of claim 10, wherein the memory module is a dynamic random access memory.

14. The system of claim 10 wherein the memory module operates with a first data width when the at least one pin provides the data signal, and operates with a second data width less than the first width when the at least one pin provides the timing signal.

* * * * *